United States Patent [19]
Morris

[11] Patent Number: 5,988,330
[45] Date of Patent: Nov. 23, 1999

[54] ADJUSTABLE SHOCK ABSORBER

[76] Inventor: Jay Morris, 3591 Sean Shelly Ln., Rescue, Calif.

[21] Appl. No.: 08/888,195

[22] Filed: Jul. 3, 1997

[51] Int. Cl.⁶ .......................................................... F16F 9/34
[52] U.S. Cl. .................................... 188/322.15; 188/319.1
[58] Field of Search ........................... 188/322.15, 282.9, 188/282.4, 318, 282.1, 314, 322.13, 322.14, 317, 316, 312, 299.1, 322.22, 319.1; 267/64.15

[56] References Cited

U.S. PATENT DOCUMENTS

| | | | |
|---|---|---|---|
| 4,036,335 | 7/1977 | Thompson et al. | 188/282.9 |
| 4,220,228 | 9/1980 | Kato | 188/319 |
| 4,313,529 | 2/1982 | Kato et al. | 188/299 |
| 4,319,106 | 3/1982 | Armitage | 200/153 J |
| 4,337,850 | 7/1982 | Shimokura | 188/319 |
| 4,463,839 | 8/1984 | Ashiba | 188/299 |
| 4,476,967 | 10/1984 | Tetsuo | 188/319 |
| 4,527,676 | 7/1985 | Emura et al. | 188/319 |
| 4,535,877 | 8/1985 | Shimokura | 188/319 |
| 4,546,959 | 10/1985 | Tanno | 267/64.15 |
| 4,591,033 | 5/1986 | Taylor | 188/317 |
| 4,615,420 | 10/1986 | Mourray | 188/322.15 |
| 4,624,347 | 11/1986 | Mourray | 188/322.15 |
| 4,635,765 | 1/1987 | Schmidt | 188/299 |
| 4,645,043 | 2/1987 | Imaizumi | 188/319 |
| 4,645,044 | 2/1987 | Kato et al. | 188/319 |
| 4,756,393 | 7/1988 | Collee et al. | 188/299 |
| 4,765,446 | 8/1988 | Murata et al. | 188/319 |
| 4,800,994 | 1/1989 | Imaizumi et al. | 188/319 |
| 4,880,086 | 11/1989 | Knecht | 188/299 |
| 4,921,272 | 5/1990 | Ivers | 280/707 |
| 4,953,671 | 9/1990 | Imaizumi | 188/299 |
| 4,958,706 | 9/1990 | Richardson et al. | 188/319 |
| 4,997,068 | 3/1991 | Ashiba | 188/319 |
| 5,035,306 | 7/1991 | Ashiba | 188/299 |
| 5,094,352 | 3/1992 | Smith | 188/282.1 |
| 5,133,434 | 7/1992 | Kikushima et al. | 188/319 |
| 5,148,897 | 9/1992 | Vanroye | 188/322.22 |
| 5,159,997 | 11/1992 | Heideman et al. | 188/282.1 |
| 5,386,892 | 2/1995 | Ashiba | 188/282 |
| 5,400,880 | 3/1995 | Ryan | 188/314 |
| 5,402,867 | 4/1995 | Nakadate et al. | 188/299 |
| 5,404,973 | 4/1995 | Katoh et al. | 188/319 |
| 5,409,090 | 4/1995 | Kashiwagi | 188/319 |
| 5,431,259 | 7/1995 | Mizutani | 188/299 |
| 5,542,509 | 8/1996 | Bell | 188/322.14 |
| 5,566,796 | 10/1996 | De Kock | 188/282.1 |

OTHER PUBLICATIONS

*"Automotive Mechanics"*(10th Ed.) by William H. Crouse and Donald L. Anglin, McGraw–Hill (1993), Chapter 49, pp. 658–674.
*"Inside Racing Technology"* by Paul Haney and Jeff Braun, TV Motorsports, (1995), Chapter 5, pp. 151–185.

*Primary Examiner*—Robert J. Oberleitner
*Assistant Examiner*—Melanie Talavera
*Attorney, Agent, or Firm*—Steven G. Lisa; Douglas W. Rudy

[57] ABSTRACT

A shock absorber incorporates a double adjustable valve using a single needle having both a tapered end portion and extended cylindrical portion. The needle is used in a shock that has a correspondingly configured radial rebound orifice and a plurality of compression orifices. With two separate and independent adjustments of the single needle, both rebound and compression characteristics can be tuned. The tapered needle formed in the end of the needle body can simply be raised and lowered in the rebound orifice to adjust rebound stiffness. Similarly, a plurality of radially extending shutter faces and fluid channels or grooves are formed in the extended cylindrical portion of the needle. The shutter faces and fluid channels are configured to cooperate with the plurality of compression orifices throughout the entire range that the needle body can be raised or lowered when adjusting rebound characteristics. The shutter faces and fluid channels are spaced apart around the circumference of the extended cylindrical portion of the needle body, and align with the compression orifices in varying combinations to open none, one, some, or all of the compression orifices when the needle body is rotated. When one of the fluid channels is aligned with one of the compression orifices, the orifice is placed in fluid communication with both upper and lower fluid chambers of the shock. The result is a simple, cost effective, reliable, double-adjustable shock absorber.

17 Claims, 10 Drawing Sheets

ADJUSTABLE SHOCK ABSORBER

FIELD OF INVENTION

This invention relates to an adjustable shock absorber, and more specifically, to a shock absorber that is easily and independently adjusted for both rebound and compression.

BACKGROUND OF INVENTION

The purpose and operation of a basic shock absorber is well known. See Crouse & Anglin, *Automotive Mechanics* (10th Ed.), McGraw-Hill (1993), at Chapter 49, and Haney & Braun, *Inside Racing Technology*, TV Motorsports (1995), at Chapter 5, both of which are incorporated herein by reference.

In general, the suspension springs support the weight of the vehicle and its load, and absorb road shocks. The shock absorbers help control or dampen spring action to avoid spring oscillation and assist in maintaining control of the vehicle, and as a result, are often referred to as "dampers." When a car moves over a bump in the road, the wheel moves up with the bump and back down on the other side of the bump. The spring and damper compress as the wheel moves up, in a mode referred to as "compression." After passing the bump, a correctly designed spring and damper system goes through a small degree of oscillation in return to its steady state condition, in a mode referred to as "rebound." Ideally, the damper will not only control oscillation, but also prevent the spring from achieving either full compression or full extension. Full compression would indicate that the vehicle's suspension system is "bottomed out." Full extension would mean that the vehicle's suspension system is "floating," and no longer in contact with the road. Thus, a well designed spring/damper system allows the vehicle chassis to remain relatively steady, and keeps the tires in contact with the ground despite bumps or holes in the road and forces caused by cornering or changes in the vehicle's speed.

In high performance applications, such as in automotive racing, the springs and dampers are considered one of the more important tunable systems on the vehicle, and one that can greatly affect the vehicle's handling characteristics. Indeed, adjusting the damper characteristics can dramatically improve the way a vehicle performs when turning around a corner, under acceleration and during braking.

More specifically, most modern dampers include an oil-filled cylinder or tube in which a piston moves up and down in response to movement of the wheel relative to the vehicle chassis. The piston typically divides the cylinder into upper and lower fluid chambers. The movement of the piston forces oil or hydraulic fluid in the cylinder to flow through small fluid passages or orifices in the piston. The orifices in the piston are typically restricted by spring-loaded check valves or disks that deflect under pressure. The resulting fluid friction limits both compression and rebound. The more easily the fluid flows through the holes, the softer the ride. In contrast, smaller holes and stiffer check valves or deflection disks, have greater restriction and provide a stiffer ride. Thus, varying the size of the orifices, or the stiffness of the valves or deflection disks, alters the rebound and compression characteristics of the spring/damper system, and changes the ride characteristics of the vehicle. For high performance applications, such adjustability is greatly desired, particularly if the rebound and compression settings can be independently and easily changed.

Many different techniques are known for adjusting damper settings. For example, it is known to change performance characteristics of a damper by removing the damper from the vehicle and disassembling it to: change the number, diameter, order and thickness of the deflection disks; substitute a piston with different size, shape and number of orifices; substitute check-valves with different loading; etc. However, removing a damper from the vehicle and disassembling it to change its internal components is both complicated and time consuming, and therefore, is undesirable. Thus, dampers were developed having external adjustments that move internal parts to change the flow restrictions in the piston or some other metering orifice, or the preload on check valves or deflecting disks. Examples of such adjustable dampers can be found in the identified texts incorporated above, and in U.S. Pat. Nos. 4,220,228, 4,313,529, 4,337,850, 4,463,839, 4,476,967, 4,800,894, 4,880,086, 4,958,706, 5,133,434, 5,402,867, 5,409,090, 5,542,509, each of which is also incorporated herein by reference.

As variously disclosed in the above references, most externally adjustable shock absorbers are complex and expensive to manufacture and maintain, and in addition, require the separate adjustment of multiple orifices, valves or deflection disks.

For example, in U.S. Pat. No. 5,402,867, a guide member is provided with separate rebound and compression guide ports, and a cooperating shutter is provided with separate rebound and compression shutter ports. By rotating the shutter within the guide member, the degree that the guide and shutter ports are "opened" or "closed" is changed, thereby altering the resistance to the flow of oil as the piston moves. However, in the '867 Patent, the rebound and compression strokes are not independently controlled. Instead, as the "rebound" ports are closed, the "compression" ports are opened. Likewise, as the "rebound' ports are opened, the "compression" ports are closed. Thus, the user can not independently set rebound and compression, thereby limiting the degree of adjustment to the damping characteristics. See also U.S. Pat. No. 5,409,090, which is similarly limited in adjustment of the rebound and compression characteristics.

U.S. Pat. No. 4,800,994, purports to provide a damper in which the rebound and compression characteristics can be set independently from each other. However, as with the '867 patent, a shutter and guide cooperate to provide three settings that simultaneously adjust the rebound and compression. Thus, it is again not possible to adjust rebound settings without also affecting the compression settings, and vice-versa.

In U.S. Pat. No. 4,337,850, still another shutter and guide arrangement is shown, with a plurality of settings between a fully closed and fully open position. An adjusting knob incorporating a spring-loaded check ball maintains the selected alignment between the shutter and guide. The adjusting knob includes markings to visually indicate the selected setting. However, once again, the compression and rebound settings cannot be set or adjusted independently, without simultaneously affecting each other. See also U.S. Pat. No. 4,220,228 which shows a similar system, and U.S. Pat. No. 4,313,529, which shows an electronic adjustment control for a shutter and guide type of system.

U.S. Pat. No. 4,476,967 discloses a damper including a bore formed in the piston rod, and having an orifice and cooperating tapered needle member in its lower end forming a passage between the upper and lower oil chambers. The oil flow through the passage during movement of the piston can be adjusted by axially displacing an adjustment rod to move the tapered needle relative to the orifice. By axially lowering the tapered needle relative to the orifice, the flow of oil is reduced, and conversely, by axially raising the tapered needle, the flow of oil is increased. The mechanism for adjusting the flow characteristics includes axially extending ridges that cooperate with a spring-loaded check ball to provide "click stops" for axially adjusting the needle. A visual indicator or scale is provided on the outer circumference of a dial member for visually indicating the adjusted position of the needle in the orifice. However, as with the shutter and guide arrangements discussed above, the '967 Patent fails to provide any mechanism to independently adjust the rebound and compression settings. See also, the text *Inside Racing Technology*, identified above, which discusses at page 168 a double-adjustable Penske shock that uses an adjustable needle valve to vary rebound settings. However, there is no discussion regarding how the compression settings of the Penske shock are adjusted.

U.S. Pat. No. 4,958,706 purports to disclose an adjustable damper incorporating separately adjustable rebound and compression settings. The damper is described as including two separate manual rebound adjusters, one each for low speed and high speed characteristics. The high speed rebound adjustment is supposedly made by rotating a knob to lower or raise an adjustment rod to limit the amount a bypass valve can open. The low speed rebound adjustment is purportedly achieved by rotating a second knob to rotate the adjustment rod to change the bias on the bypass valve. The compression characteristics of the damper are also said to be adjustable by a separate manual adjuster, preferably on a separate reservoir. Two alternate embodiments are also briefly described in which one knob is said to be used to achieve linear displacement of the adjusting rod in the tubular piston rod to adjust compression, and the second knob is used to adjust either the high speed or low speed rebound characteristics. In the latter embodiments, a cup-shaped valving member has a tapered valving surface which cooperates with an annular manifold in the piston. The degree to which the tapered valving surface of the cup-shaped member extend into the annular manifold controls the compression rate characteristics of the damper. The adjustments are all made manually by turning knobs. However, the devices of the '706 Patent are both complex and expensive to manufacture, and correspondingly difficult to maintain and use reliably.

U.S. Pat. No. 5,133,434 shows a damper that is independently adjustable in rebound in compression. A first adjustment knob is used to rotate an actuating rod to turn a spring seat and thereby adjust the bias on a rebound disk valve. A second adjustment knob is used to rotate an adjustment rod to align orifices of different size to vary the rate of flow to the compression valve. A second embodiment is also shown in which both the compression and rebound characteristics are adjusted by rotating separate rebound and compression rods to vary the path area in corresponding throttling orifices in the rebound and compression valves. However, the system of the '434 Patent relies on a complex and expensive arrangement of radial paths, grooves and throttling ports.

Thus, the need exists for a high-performance damper or shock that is easily and independently adjusted in both rebound and compression, that is effective and reliable, and that is easily and economically manufactured.

SUMMARY OF THE INVENTION

It is an object of the present invention to provide an adjustable, high-performance shock absorber or damper that is easily installed or replaced with little or no modification of existing suspension system mounting surfaces.

It is another object of this invention to provide an adjustable shock or damper that is easily and quickly adjusted in both rebound and compression without requiring the use of hand tools or disassembly of the shock.

It is another object of this invention to provide a double-adjustable shock or damper that is both durable and reliable.

It is another object of this invention to provide separate adjustment of compression and rebound settings for a shock or damper using a single coaxial adjustment rod operating through a hollow piston rod.

It is another object of this invention to provide an adjustable shock or damper that uses a single needle body to vary both compression and rebound settings.

It is another object of this invention to provide a shock or damper that allows the compression and rebound characteristics to be set or adjusted independently of each other.

It is another object of this invention to provide an adjustable shock or damper incorporating a positive locking detente system that ensures correct alignment of fluid orifices, channels and passages.

It is another object of this invention to provide a shock absorber that can be independently adjusted to different bump and rebound characteristics while still allowing the shock fluid to flow through the same primary supply orifices.

It is another object of this invention to provide an adjustable shock or damper that uses a plurality of axially extending fluid channels in a needle body to both retain a detente ball and to coact with fluid orifices to allow the flow of oil between the damper chambers.

It is another object of this invention to provide a shock or damper that allows setting of compression characteristics by rotating an adjustment rod to selectively align a series of axially formed fluid channels or grooves with different-sized compression orifices to vary the amount of fluid bypass for a main piston during a compression stroke.

It is another object of this invention to provide a shock or damper that allows setting of rebound characteristics by sliding the same adjustment rod used for adjusting compression inward or outward of a single centered orifice in a hollow piston rod, allowing fluid to bypass the main piston during the rebound stroke.

It is another object of this invention to provide an improved method for independently adjusting both the rebound and compression characteristics of a shock or damper.

It is another object of this invention to provide a double-adjustable shock or damper that is relatively easy and cost effective to produce.

It is another object of this invention to provide a double-adjustable shock or damper that is easily adjusted by an electrical signal controlled by a vehicle operator or from input received from a road surface or other sensing device.

The above and other objects are achieved by a shock absorber that incorporates a double adjustable valve using a single a needle having both a tapered end portion and extended cylindrical portion. The needle is used in a shock that has a correspondingly configured radial rebound orifice and a plurality of different-sized compression orifices. With two separate and independent adjustments of the single needle, both rebound and compression characteristics can be tuned. The tapered needle formed in the end of the needle body can simply be raised and lowered in the rebound orifice to adjust rebound stiffness. Similarly, a plurality of radially extending shutter faces and fluid channels or grooves are formed in the extended cylindrical portion of the needle. The shutter faces and fluid channels are configured to cooperate with the plurality of compression orifices throughout the entire range that the needle body can be raised or lowered when adjusting rebound characteristics. The shutter faces and fluid channels are spaced apart around the circumference of the extended cylindrical portion of the needle body, and align with the compression orifices in varying combinations to open one, some, or all of the compression orifices when the needle body is rotated. When one of the fluid channels is aligned with one of the compression orifices, the orifice is placed in fluid communication with both upper and lower fluid chambers of the shock. The result is a simple, cost effective, reliable, double-adjustable shock absorber.

The above and other objects are also achieved by shock absorber that is adjustable in both rebound and compression, and that includes a shock cylinder having a fluid housing. A hollow piston rod is axially and slidably retained within the cylinder. The hollow piston rod has a first end protruding outside of the shock cylinder and a second opposing end retained with the cylinder, and includes a primary fluid orifice axially located between the first and second ends. A piston is coupled proximate to the second end of the piston rod, and divides the fluid housing of the shock cylinder into first and second fluid chambers. The piston including a central hub portion having a radial fluid passage extending throughout its center and opening at one end to the first fluid chamber, and forming a rebound valve orifice at its other end. The central hub of the piston also includes a hollow sleeve portion including at least one outboard supply orifice and a plurality of different-sized compression orifices axially located intermediate the rebound valve orifice and the outboard supply orifice. The central hub further includes at least one inboard supply orifice axially located between the rebound valve orifice and the opening in the radial fluid passage to the first fluid chamber. An adjustment rod is axially and slidably retained within the hollow piston rod and has a first end portion located proximate the rebound valve orifice in the fluid passage and the compression fluid orifices, and a second end portion extending outside the protruding end of the piston rod. A double adjustable valve is formed proximate the first end portion of the adjustment rod, and includes an adjustable rebound needle valve and an adjustable compression shutter valve. The rebound needle valve comprises a tapered end portion of a needle that is configured to cooperate with the rebound valve orifice in the radial fluid passage in the piston. The compression shutter valve comprises an extended body portion of the needle having a plurality of raised radially extending shutter faces separated by a plurality of radially extending fluid channels. The shutter faces and fluid channels are configured so that when a shutter face is aligned with a compression fluid orifice in the piston rod the orifice is closed, and when a fluid channel is aligned with a compression fluid orifice in the piston rod, the orifice is open and in communication with both fluid chambers through the inboard and outboard supply orifices. A rebound adjusting element is coupled proximate the second end portion of the adjustment rod and is configured to raise and lower the tapered end portion of the needle relative to the rebound valve orifice in the radial fluid passage A compression adjusting element is coupled proximate the second end portion of the adjustment rod and is configured to rotate the extended body portion of the needle to selectively align varying combinations of the shutter faces and fluid channels relative to the different sized compression fluid orifices.

In its preferred form, the rebound adjusting element takes the form of a rotating knob that is coupled to and causes the adjusting rod to raise or lower within the hollow piston rod when the knob is rotated. The tapered portion of the needle valve is configured so that it may be selectively positioned relative to the rebound valve orifice between the range of fully closing the rebound valve orifice and fully opening the rebound valve orifice. The compression adjusting element likewise comprises a rotating knob, but is coupled to and causes the adjusting rod to rotate within the hollow piston rod when the knob is rotated. The compression fluid orifices in the hollow piston rod preferably include a large orifice and a small orifice, and the shutter valve is configured so that it may selectively: (a) open both compression orifices, (b) open only the large compression orifice, and (c) open only the small compression orifice.

The rebound and compression adjusting elements are independently operable. In its preferred form, there are a plurality of outboard supply orifices, each one being axially aligned with one of the different sized compression orifices. Because each outboard supply orifice is large relative to the rebound needle valve, there will always be an over-supply of fluid to the rebound needle valve during the rebound stroke, regardless of the compression setting. Thus, even if only one compression orifice is open, the corresponding open supply orifice can provide an over-supply of fluid capacity to the rebound needle valve during the rebound stroke.

In its preferred form, the shock absorber includes a check valve located axially between the inboard supply orifice and the rebound needle valve. The check valve is operable to close during a compression stroke to preclude oil from flowing through the rebound needle valve. When so closed, the check valve forces oil to flow from the first chamber to the second chamber through the radial fluid passage, the inboard supply orifice, any open compression orifice, the fluid channel aligned with the open compression orifice, the outboard supply orifice, and the primary fluid orifice in the hollow piston rod. During a rebound stroke, the check valve is configured to open, and the piston forces oil to flow from the second chamber to the first chamber through the primary orifice in the hollow piston rod, the outboard supply orifice, a fluid channel in the needle body, the open needle valve, and the radial fluid passage in the piston.

The above and other objects are also achieved by a shock that has a radial rebound orifice and a plurality of variously sized compression orifices. A single needle body has both a tapered end portion and an extended cylindrical portion. A tapered needle is formed in the tapered end portion of the needle body and is configured to be raised and lowed in the radial rebound orifice. A plurality of shutter faces and radially extending fluid channels are formed in the extended cylindrical portion of the needle body, and are configured to cooperate with the plurality of different sized compression orifices throughout the entire range that the needle body can be raised or lowered in the radial rebound orifice. The tapered end portion of the needle closes the radial rebound orifice when lowered completely therein and opens the radial rebound orifice when raised therefrom. The shutter faces and fluid channels are spaced apart around the circumference of the extended cylindrical portion of the needle body and align with the compression orifices in varying combinations to selectively open either one, some, or all of the compression orifices when the needle body is rotated.

The above and other objects are also achieved in a method of adjusting both rebound and compression characteristics of a shock absorber, wherein the shock absorber includes a moving piston dividing the shock into upper and lower fluid chambers, and has a radial rebound orifice and plurality of different sized compression orifices. In accordance with the method, the rebound characteristics are adjusted by rotating a first knob to raise or lower a tapered end portion of a needle relative to the radial rebound orifice to correspondingly increase or restrict the flow of oil through the rebound orifice during a rebound stroke of the shock. The compression characteristics are adjusted by rotating a second knob to rotate a cylindrical portion of the needle having a plurality of axial fluid channels to variably align selected of the channels with the plurality of different sized compression orifices to selectively place various combinations of the different sized compression orifices in communication with both fluid chambers over the complete range that the needle is raised or lowered during adjustment of the rebound characteristics. A detente ball, biased by at least one o-ring or a spring, is used to engage one of the axial grooves in the cylindrical portion of the needle to retain the selected alignment between the channels and the compression orifices.

The preferred embodiments of the inventions are described below in the Figures and Detailed Description. Unless specifically noted, it is intended that the words and phrases in the specification and claims are given the ordinary and accustomed meaning to those of ordinary skill in the applicable art(s). If any other special meaning is intended for any word or phrase, the specification will clearly state and define the special meaning. For example, the terms "damper" and "shock" are used interchangeably, as are the terms "bump" and "compression" and the terms "channel" and "groove."

Likewise, the use of the words "function" or "means" in the Detailed Description is not intended to indicate a desire to invoke the special provisions of 35 U.S.C. Section 112, ¶6, to define the invention. To the contrary, if the provisions of 35 U.S.C. Section 112, ¶6, are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means of step, then the intention is not to invoke the provisions of 35 U.S.C. Section 112, ¶6. Moreover, even if the provisions of 35 U.S.C. Section 112, ¶6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

For example, the shock may be used in a strut assembly or mounted independently from the spring. Likewise, the shock can be configured to be mounted with the piston rod fixed to the chassis and the cylinder moving with the suspension, or vice versa. Further, the number of orifices and their sizes may vary, and various detente or valving mechanisms can be substituted for the ball-type check and detente mechanisms shown in the preferred embodiments. Similarly, while rotating knobs are shown as the adjusters, electronic and other manual systems can easily be substituted. In addition, monotube or multi-tube shocks can be employed, and the adjustable valving system can easily be moved to an external reservoir. Also, while oil is the preferred fluid, any other suitable fluid can be substituted. Other variations will become apparent from a review of the detailed description set forth below.

BRIEF DESCRIPTION OF THE DRAWINGS

The preferred embodiment, and characteristics, and benefits of the present invention can be more easily understood from the following descriptions of the preferred embodiments in combination with the accompanying drawings.

DETAILED DESCRIPTION

As is well known in the art, a shock absorber or damper is basically an oil filled cylinder or tube in which a piston is caused to move up and down in response to wheel movement or weight transfer of the vehicle. The movement of the piston forces oil (typically hydraulic fluid) to flow through small fluid passages or orifices in the piston. The resulting fluid friction limits spring bounce. Depending on the vehicle design, a shock absorber can be mounted separately from the spring, in a coil-over-spring configuration, or in a strut assembly. The present invention applies to all three configurations, and is not intended to be limited in application.

Figure 1:
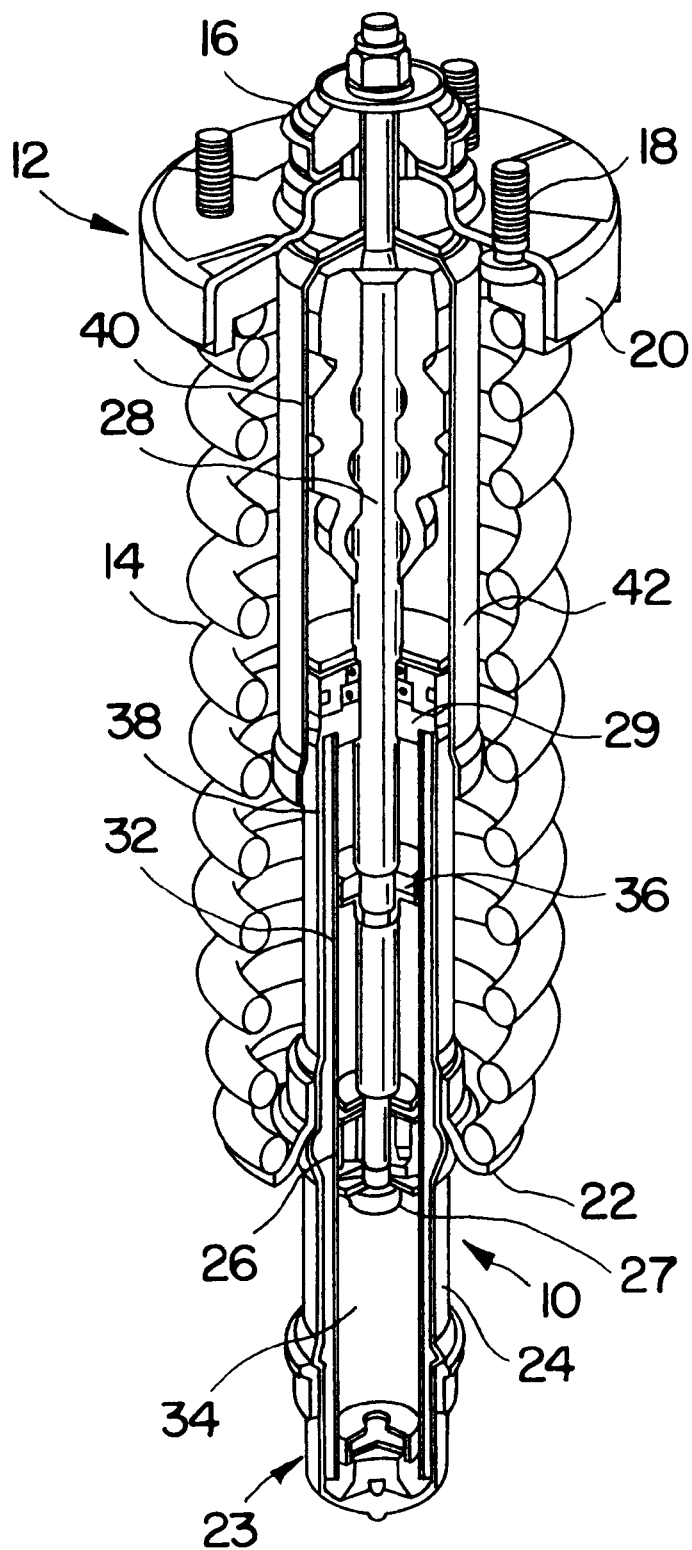
FIG. 1 is a perspective view of a typical shock absorber and spring combination.

Shown in FIG. 1 is partial cut-away view depicting the construction of a simple shock absorber 10 mounted, by way of example, in a strut assembly 12 with a coil spring 14. The strut assembly 12 includes a strut mount 16 having plurality of protruding body mounting bolts 18 and an inverted cup-shaped upper spring retainer 20. The upper mounting bolts 18 connect the strut mount 16 to the vehicle frame (not shown). A strut base 23 is typically coupled to a moving portion of the suspension, such as the axle housing, control arm or hub (not shown). The upper spring retainer holds and retains the upper portion of the coil spring 14. The strut assembly 12 also includes a lower spring mount 22 retaining the lower portion of coil spring 14. In some cases, one of the spring mounts may be adjustable.

The shock absorber assembly 10 includes a cylinder 24 which slidably retains a piston 26 connected to a lower portion of piston rod 28 by a nut 27. The piston rod 28 passes through a seal 29, extends out the top of the cylinder housing 24 and includes a threaded end that is retained in the upper strut mount 16 by a nut. The piston 26 divides the cylinder into an upper fluid chamber 32 and a lower fluid chamber 34.

In many shocks, a floating piston 36 further defines an additional chamber 38 that is filled with gas, such as nitrogen. If desired, a jounce bumper 40 is retained above the top of the cylinder 24 in a dust shield 42.

Figure 2:
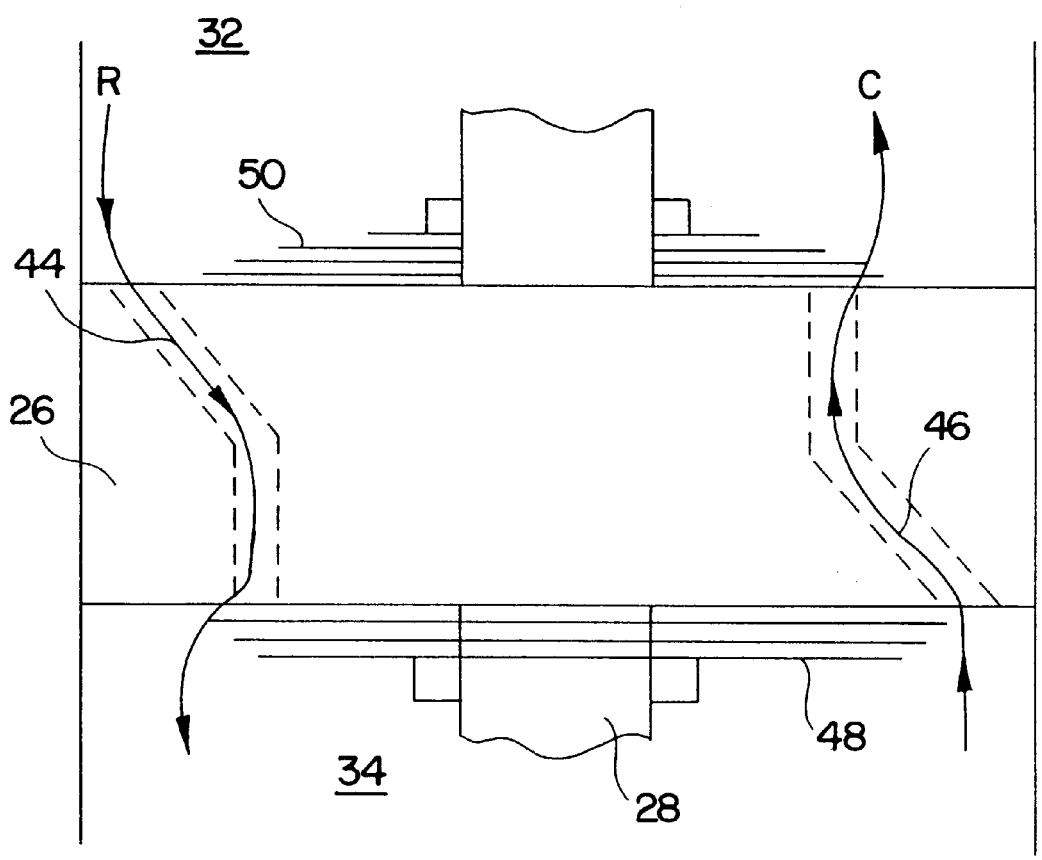
FIG. 2 is simplified detail view of typical piston with rebound and compression deflection disk valves.

As shown in simplified form in FIG. 2, a typical shock piston 26 includes a plurality of rebound orifices 44 and compression (or "bump") orifices 46 that are sized and located so that they can be covered by a stack of washers or disks forming valves on each side of the piston. More specifically, a rebound valve stack 48 comprises a plurality of deflection disks retained flush to the rebound orifices 44 on the bottom of the piston 26. Similarly, a compression or bump valve stack 50 comprises a plurality of deflection disks retained flush to the bump orifices 46 on the top of the piston 26. The rebound orifices 44 are offset outside the compression valve stack 50 at the top of the piston 26 so as to be in open communication with the upper fluid chamber 32. Similarly, the compression orifices 46 are offset outside the rebound valve stack 48 at the bottom of the piston 26 so as to be in open communication with the lower fluid chamber 34.

In normal operation, compression valve stack 50 cooperates with the compression orifices 46 to form a one-way valve, allowing flow of oil through piston 26 from the lower chamber 34 to the upper chamber 32 during the compression stroke in the direction of arrow C, while at the same time, the rebound valve stack 48 precludes any such flow. In a similar manner, the rebound valve stack 48 cooperates with the rebound orifices 44 to form a one-way valve, allowing flow of oil through piston 26 from the upper chamber 32 to the lower chamber 34 during the rebound stroke in the direction of arrow R, while at the same time, the compression valve stack 50 precludes any such flow. Thus, the initial compression and rebound characteristics of the shock are determined by the size and number of orifices 44,46 in the piston 26, and the pressure necessary to deflect the disks of the cooperating valve stacks 48,50. It will be apparent that FIG. 2 depicts in simplified form for illustrative purposes the simultaneous flow of fluid in both directions, and that in operation, flow will generally occur in only one direction at any given time.

With the above as background, reference is now made to FIGS. 3–11, which depict the present invention and its systems and methods for easily and independently adjusting the compression and rebound settings for a shock absorber.

Figure 3:
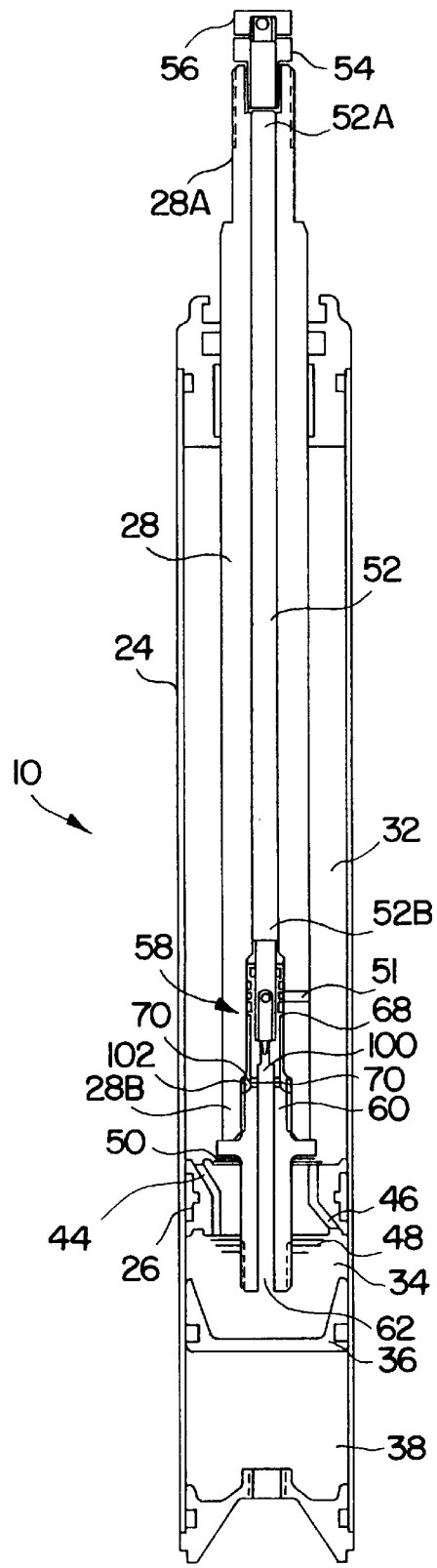
FIG. 3 is a longitudinal section view of an adjustable shock absorber according to the present invention.

More specifically, FIG. 3 is a cut-away view of the shock absorber 10 including a cylinder 24, piston 26, and a hollow piston rod 28. The hollow piston rod 28 passes through a seal, and extends out the top of the cylinder housing 24. The piston 26 again divides the cylinder into a first (or lower) fluid chamber 34 and a second (or upper) fluid chamber 32. The shock piston 26 includes a plurality of rebound orifices 44 that cooperate with a rebound valve stack 48, and a compression valve stack 50 that cooperates with the rebound orifices 46 in the manner discussed above. The piston 26 is typically attached to the piston rod 28 using threads.

The hollow piston rod 28 is axially and slidably retained within the cylinder 24, and has a first end 28A protruding outside of the shock cylinder 24 and a second opposing end 28B retained with the cylinder. The piston rod 28 also includes a primary fluid orifice 51 axially located between its first end 28A and second end 28B. In its preferred embodiment, there is one large primary fluid orifice 51, although a plurality of smaller orifices can also be used. The primary fluid orifice 51 places the hollow inside portion of the piston rod 28 in fluid communication with the second fluid chamber 32. Axially and slidably retained within the hollow portion of the piston rod 28 is an adjusting rod 52. The adjusting rod 52 includes at its first end portion 52A two adjustment knobs 54 and 56, and at its opposing end 52B a dual-action adjustment valve 58.

Figure 6:
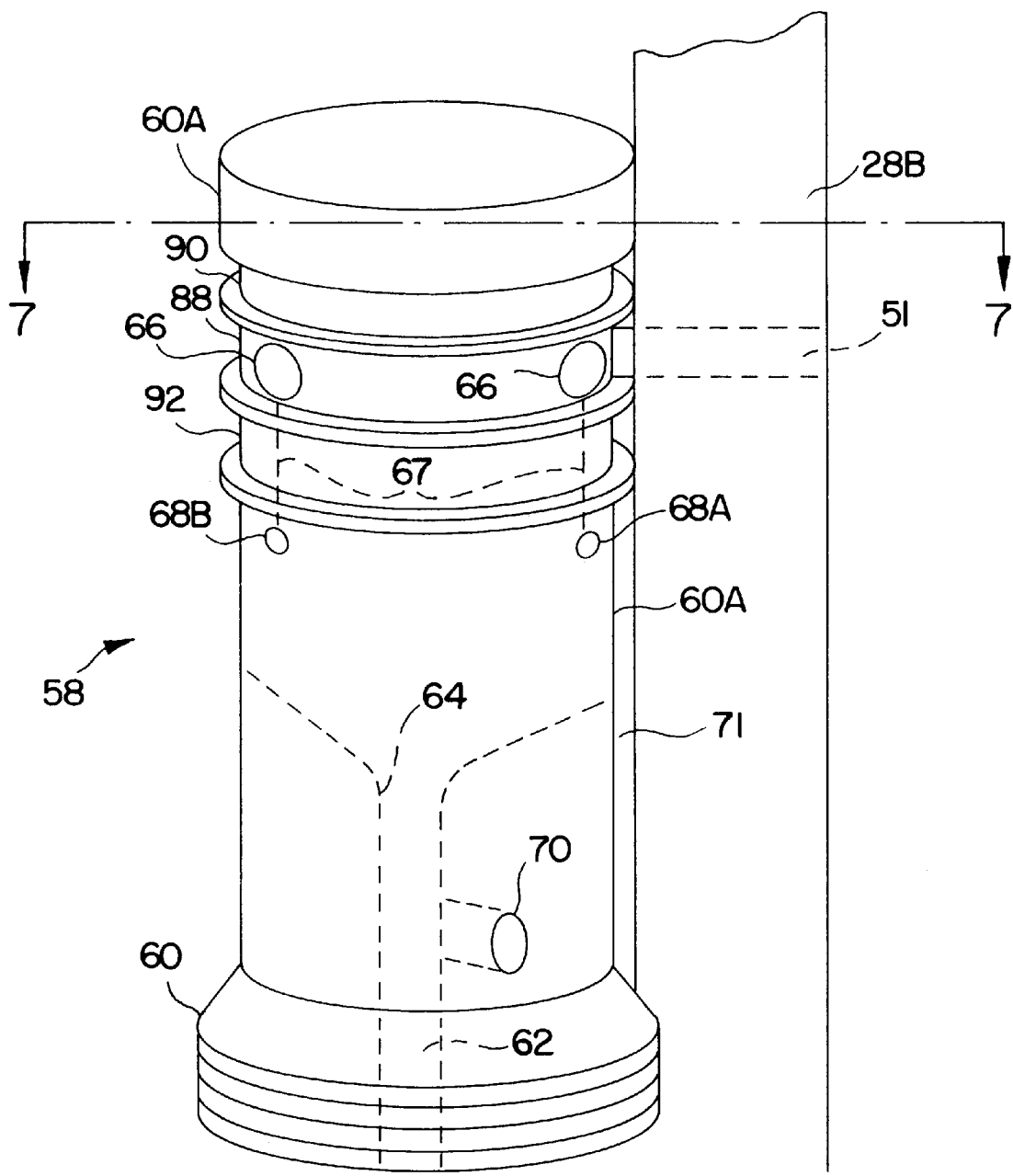
FIG. 6 is a section view of the central hub portion of the piston, including the parts of the double-adjustable valve.

The piston 26, as referred to in FIG. 6, includes a central body portion or hub 60 (also referred to as a "piston stud") having radial fluid passage 62 communicating at one end with the first fluid chamber 34, and having an opposed end forming a rebound valve orifice 64. In the preferred embodiment, the central body portion 60 of the piston 26 forming the rebound valve orifice 64 actually extends into the lower portion 28B of the hollow piston rod 28. The central hub portion 60 of the piston 26 also includes a hollow sleeve portion 60A including at least one outboard supply orifice 66 and a plurality of different-sized compression orifices 68A and 68B axially located intermediate the rebound valve orifice 64 and the outboard supply orifice 66. The central hub 60 further includes at least one inboard supply orifice 70 axially located between the rebound valve orifice 64 and the opening in the radial fluid passage 62 to the first fluid chamber 34.

In its preferred form, the extended portion of the hub portion 60 of the piston 26 is of a reduced diameter, thereby forming a compression fluid channel 71 between the different sized compression orifices 68 and the inboard supply orifices 70. In addition, the different sized compression orifices 68 are all smaller than the relatively larger outboard supply orifices 66 and inboard supply orifices 70. Also, for reasons that are discussed below, each outboard supply orifice 66 is axially aligned with an associated compression orifice 68, as indicated by the dotted lines 67 of FIG. 6.

As an alternative, the piston proper 26 may be directly threaded or fastened to the piston rod 28, and the radial fluid passage 62 and rebound valve orifice 64 may be formed directly in the lower portion of the piston rod 28B. Indeed, it should be understood that all elements of the invention described as being formed in the extended portion of the piston hub 60 may alternatively be formed in the end portion 28B of the piston rod 28.

The double-adjustable valve 58 coupled to or formed in the first end portion 52B of the adjusting rod 52 includes an adjustable rebound needle valve 72 and an adjustable compression shutter valve 74. The adjustable needle valve 72 is formed from a tapered end portion 76 of an extended needle 78 coupled to or otherwise formed in the end portion 52B of the adjusting rod 52. The tapered end portion 76 of the needle 78 is configured to cooperate with the rebound valve orifice 64 in the radial fluid passage 62 of the piston hub 60. As will be explained in greater detail below, the relationship between the tapered end portion 76 of the needle 78 and the rebound valve orifice 64, form the mechanism for adjusting the rebound characteristics of the shock 10.

The compression shutter valve 74 comprises an extended cylindrical body portion 73 of the needle 78 which is configured to cooperate with the both the outboard supply orifices 66 and the different sized compression orifices in the piston hub 68. The cylindrical body portion 73 of the needle 78 includes a plurality of raised, radially extended, shutter portions or faces 80 separated by a plurality of extended radial fluid channels or grooves 82. The raised shutter portions 80 are configured so that when a flush portion of a shutter 80 is aligned with an outboard supply orifice 66 and associated compression orifice 68, those orifices are closed. In contrast, when a fluid channel 82 of the needle body 78 is aligned with an outboard supply orifice 66 and associated compression orifice 68, an "open" fluid path is formed between the fluid chamber 32, the primary fluid orifice 51 in the hollow piston rod 28, the outboard supply orifice 66, the channel 82 in the needle 78, the compression orifice 68, the compression fluid channel 82, the inboard supply orifice 70, the radial fluid passage 62, and the fluid chamber 34. Thus, by rotating the needle body 78 to selectively "open" or "shut" the variously sized compression orifices 68, the compression characteristics of the shock can be varied or adjusted.

The rebound adjusting element 54 coupled proximate the second end portion 52A of the adjustment rod 52 is operable to raise and lower the adjustment rod 52, and correspondingly, to cause the tapered end portion 76 of needle 78 to raise or lower relative to the rebound valve orifice 64 in the piston fluid passage 62. In its preferred form, the adjusting element 54 is a knob that is threaded relative to the hollow piston rod 28 so that, when it is rotated, it moves axially inward or outward (depending on direction) to correspondingly raise or lower the needle 78 formed in or coupled to the opposing end 52B of the adjusting rod 52. It should be understood that electronic controls can easily be substituted for the manual rotation knob 54.

A compression adjusting element 56 is also coupled to the end portion 52A of the adjustment rod 52, and is configured to rotate the adjusting rod 52 and the needle body 78 to selectively align varying combinations of the shutter portions 80 and axial grooves or fluid channels 82 relative to the different sized compression orifices 68. In its preferred form, the compression adjusting element comprises a knob affixed to the end of the adjusting rod 52 that simply rotates the rod 52 without raising or lowering the rod 52. As above, electronic controls can easily be substituted for the manual knob 56.

Thus, whereas the rebound adjusting knob 54 causes the adjusting rod 52 and needle 78 to raise or lower within the hollow piston rod 28, the compression adjusting knob 56 causes the adjusting rod 52 and the needle 78 to rotate within the hollow piston rod 28. As a result, the single needle element 78 having its tapered portion 76 and extended body portion 73 with channels 82 and shutter faces 80 may be simply, easily and independently raised or lowered to adjust rebound settings, and also rotated to adjust compression settings.

Referring now to FIGS. 6 and 7A–7C, the configuration of the outboard supply orifices 66, compression orifices 68, and inboard supply orifices 70 are described in greater detail. In the preferred embodiment, two large outboard supply orifices 66 are shown in a circumferential supply groove or channel 88 in the outboard hub portion 60 of the piston 26. The supply channel 88 aligns with the primary fluid orifice 51 in the hollow piston rod 28, and thus, is in constant communication with fluid chamber 32. Above the supply channel 88 is a recess 90 for an upper o-ring seal (not shown). Below the supply channel 88 is a detente channel 92, in which a hole 94 is drilled to retain a detente ball 96. The detente ball 96 is biased inward by two o-rings (not shown) retained in the detente channel hole 94. Aligned in the axial direction with the two outboard supply orifices 66 are two different sized compression orifices 68A and 68B. Compression orifice 68B is shown larger than orifice 68A. Below the compression orifices 68A and 68B, in the area of reduced diameter of the hub portion 60 of the piston 26, is at least one large inboard supply orifice 70. The inboard supply orifice 70 is in fluid communication with the radial fluid passage 62 in the piston 26 below the needle valve orifice 62 and check valve 100.

Figure 7A:
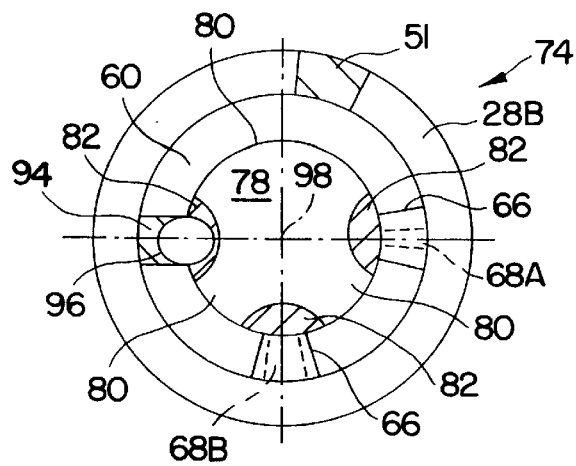
FIGS. 7A–C are plan views depicting various compression settings for the adjustable shutter vale, taken along lines 7—7 of FIGS. 3 and 4.
Figure 7B:
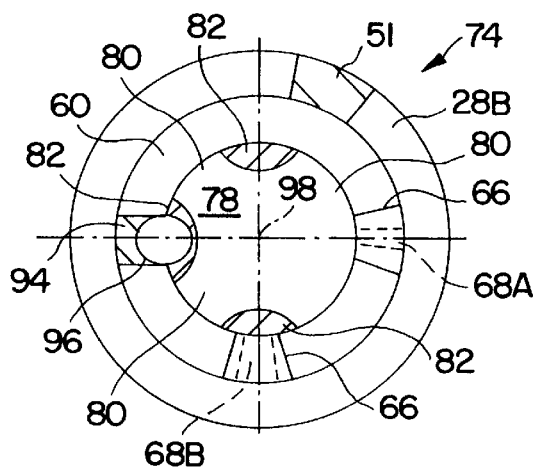
Figure 7C:
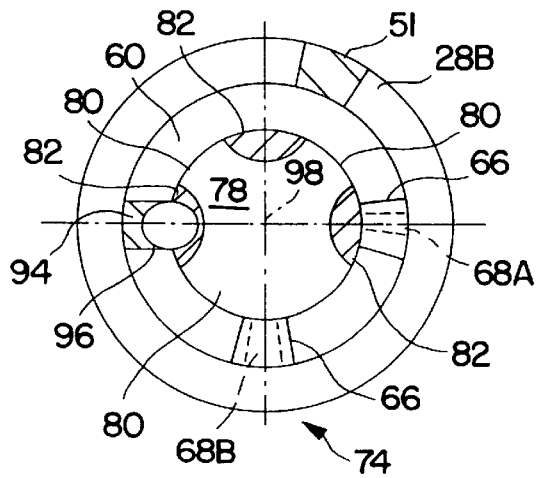

Referring additionally to FIGS. 7A–7C, the preferred manner of adjusting the compression settings is described.

For ease of explanation, FIG. 7 depicts the various cooperating elements of the invention in simplified form, with the needle body 78 retained within the hollow portion of the hub 60, which in turn extends within the bottom portion of the hollow piston rod 28B. As discussed above, the large primary fluid orifice 51 is in constant fluid communication with the supply groove 88 as shown in FIG. 6. Shown in the hub portion 60 of the piston 26 is the detente ball 96 and the two large outboard supply orifices 66. The axially aligned and smaller compression orifices 68A and 68B are represented by the dotted lines contained within the supply orifice indications 66. In the preferred embodiment, the outboard supply orifices 66 and compression orifices 68 are radially aligned at right angles, as indicated by the cross-hairs 98. The needle 78 is shown with three fluid channels 82 aligned at right angles to each other, separated by three shutter faces 80. By rotating the adjustment knob 56 to selectively align the fluid channels 82 or shutter faces 80 with the outboard supply orifices 66 and the associated different sized compression orifices 68A and 68B, the flow of oil between the two chambers 32 and 34 during compression strokes can be varied.

For example, as shown in FIG. 7A, and using a clockwise rotation of the adjustment knob 56 as a reference, a first fluid channel 82 is shown aligned with the detente ball 96, and the two remaining channels 82 are shown aligned with the small compression orifice 68A and also the large compression orifice 68B (and their associated outboard supply orifices 66). This setting would indicate the "softest" compression setting, as the fluid paths between both compression orifices 68A and 68B and their outboard supply orifices 66 are "open" to the fluid chamber 32 through the primary orifice 51. When the knob 56 is rotated clockwise one "click," as shown in FIG. 7B, only the large compression orifice 68B and its associated outboard supply orifice 66 are left in "open" fluid communication with the chamber 32 through primary orifice 51. Thus, the setting of FIG. 7B reflects the next "stiffer" compression setting because less fluid is able flow through the single large compression orifice 68B. Similarly, when the adjustment knob 56 is rotated one more "click," as shown in FIG. 7C, only the small compression orifice 68A and its associated outboard supply orifice 66 are left in "open" fluid communication with the chamber 32 through primary orifice 51. Thus, the setting of FIG. 7C reflects the "stiffest" compression setting, as even less fluid is able to flow through the single smallest compression orifice 68A.

Thus, the shutter valve 74 is configured so that simple rotation of the needle body 78 may selectively: (a) open all compression orifices, (b) open only the large orifice, and (c) open only the small orifice. It should be apparent that more than two compression orifices 68 may be used, with corresponding numbers of fluid channels 82 and shutter faces 80.

In the preferred embodiment, the detente ball 96 cooperates with the fluid channels 82 to retain the desired alignment between the channels 82, shutter faces 80, and the compression orifices 68. The detente ball also serves to provide the indicated compression adjustment of the shock by providing clear "clicks" as the adjustment knob 56 is rotated. In the preferred embodiment, there is a 180 ° shutter face 80 followed by three fluid channels 82 dispersed radially at 90 degree increments. Thus, the user will know that the first "click" after the long 180° dead space corresponds to the settings of FIG. 7A, and consecutive "clicks" thereafter complete the sequence of settings in FIGS. 7B and 7C. A plurality of rubber o-rings, depicted in FIGS. 4 and 5, placed in the detente channel 92, serve to provide a simple pressure bias that can be overcome by rotating the adjustment rod 52.

Due to the extended length of the body portion of the needle 78, and correspondingly, the extended length of the fluid channels 82 and the shutter faces 80, the compression settings can be adjusted throughout the entire range over which the rebound setting, discussed below, may be set. Thus, even when the rebound setting is moved axially from completely "soft" to completely "stiff," the fluid channels 82 and shutter faces 80 remain in proper relation with the supply orifices 66 and the compression orifices 68A and 68B.

Figure 8A:
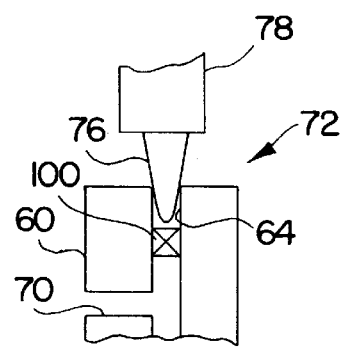
FIG. 8A and 8B are plan views showing representative rebound settings for the adjustable needle valve.
Figure 8B:
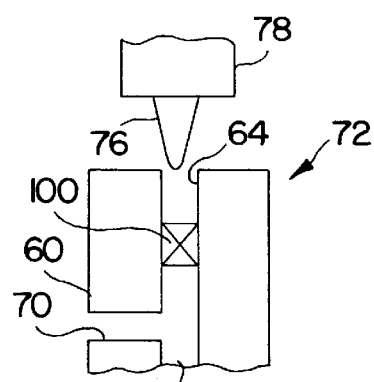

Specifically, referring now to FIGS. 8A and 8B, it is seen that rebound characteristics are set by selectively positioning the tapered portion 76 of the needle 78 relative to the rebound valve orifice 64 in the axial fluid passage 62 of the piston hub 60. By rotating the rebound adjustment knob 54, which is preferably threaded, the adjustment rod 52 is raised or lowered (depending on direction) inside the hollow piston rod 28. Raising and lowering the adjustment rod 52 correspondingly raises an lowers the tapered portion 76 of the needle 78 in the rebound valve orifice 64. When the rebound valve orifice 64 is fully closed by the tapered end portion 76 of the needle 78, as shown in FIG. 8A, the rebound characteristics of the shock are set at the fully "stiff" setting. When the tapered end portion 76 of the needle 78 is backed fully out of the rebound valve orifice 64, as shown in FIG. 7B, the rebound characteristics of the shock are set at the fully "soft" position.

Figure 4:
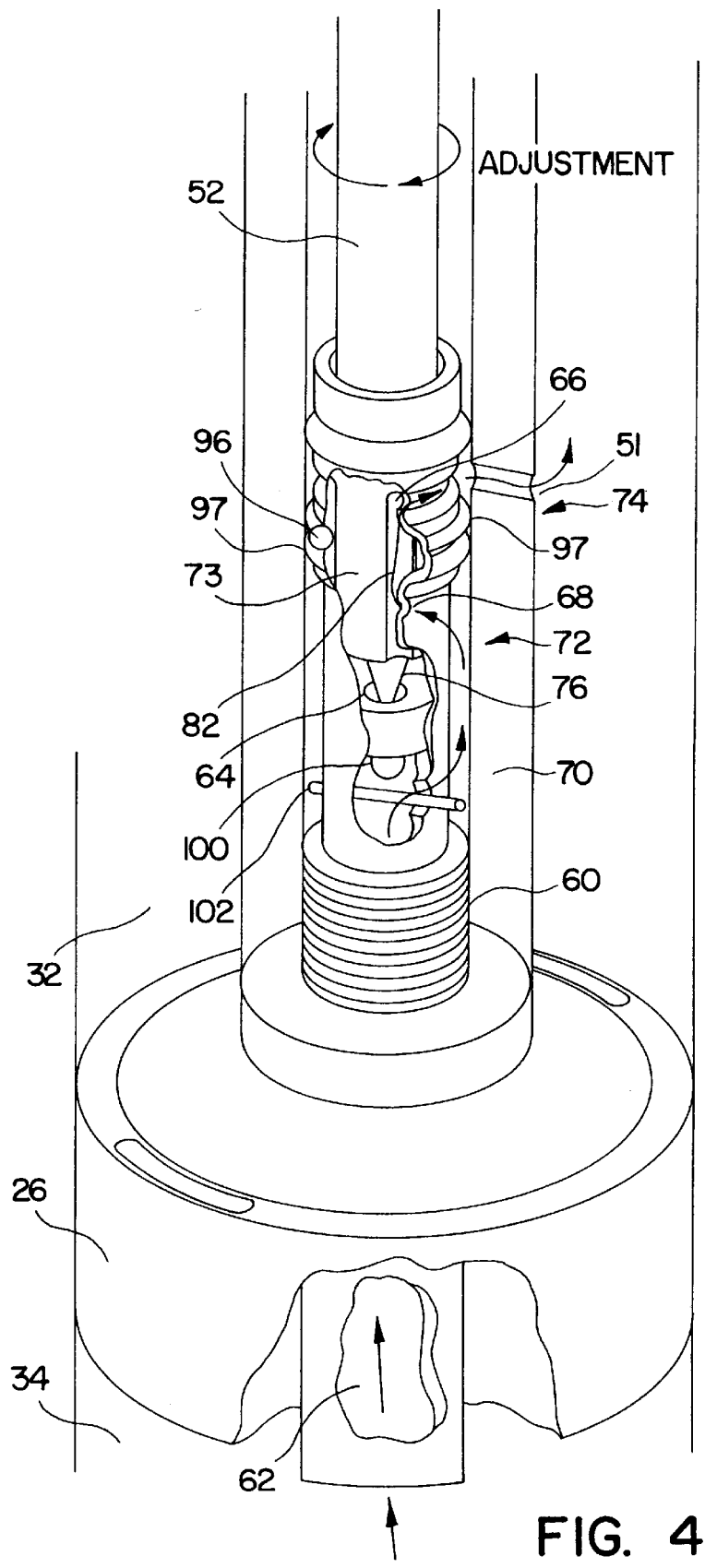
FIG. 4 is a detailed perspective view of the piston and adjustable valve portions of the shock in the compression mode of operation.
Figure 10:
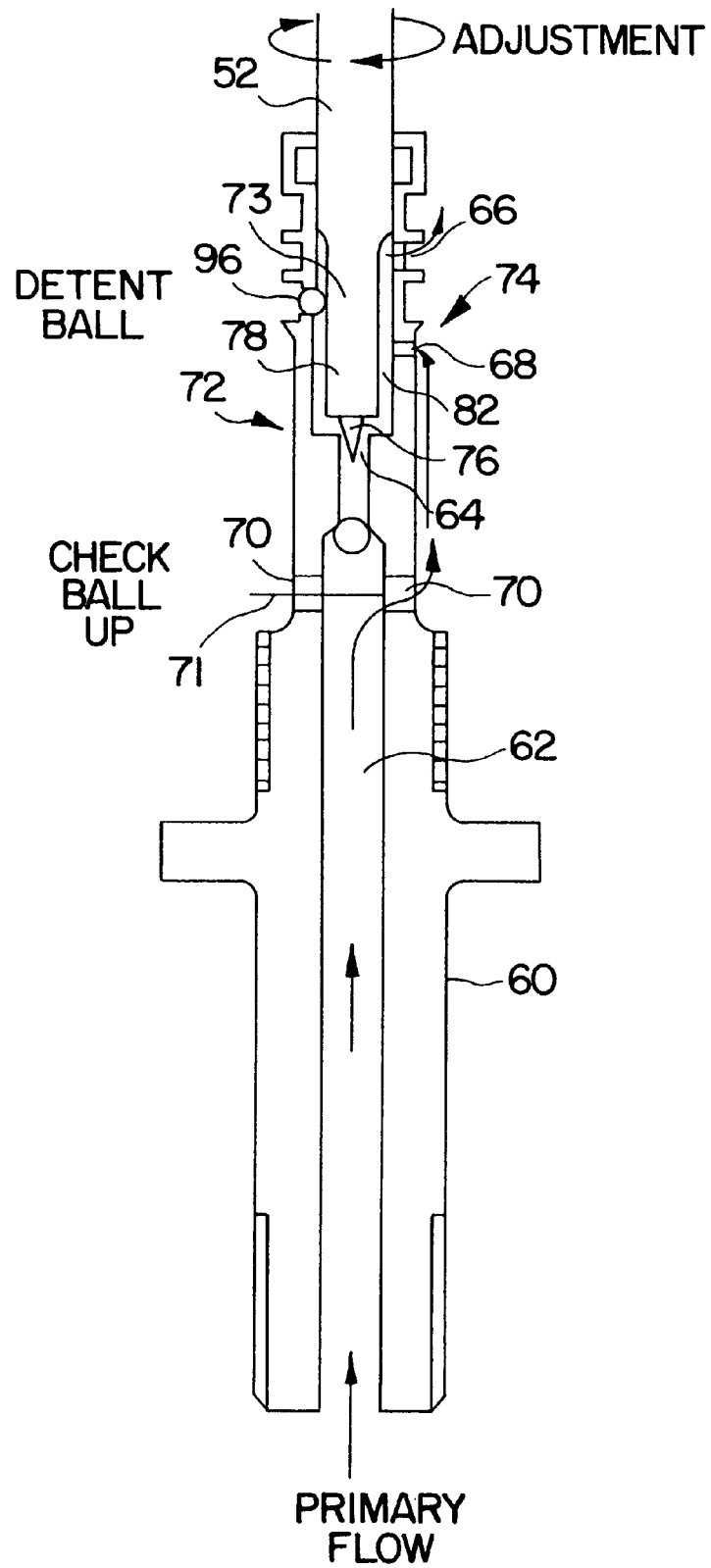
FIG. 10 is a detailed section view of the piston and adjustable valve portions of the shock in the compression mode of operation.

Also shown schematically in FIGS. 8A and 8B is a one way check valve 100 shown positioned between the needle valve orifice 64 and the inboard supply orifice 70. As shown in FIGS. 4 and 10, the one-way check valve preferably comprises a simple ball valve and ball check retainer pin 102. Ball check retainer pin 102 is slidably received loosely into opposing inboard supply orifices 70, and is contained there in by the side wall of 28B. The diameter of ball check retainer pin 102 is significantly smaller than the diameter of inboard supply orifice 70, and therefore does not restrict the flow of oil through the inboard supply orifice 70. The check valve is forced open during the rebound stroke and closed during the compression stroke. In addition, the capacity of the rebound needle valve 72 is relatively small compared to the capacity of even one of the outboard supply orifices 66. Thus, even if the compression shutter valve 74 is set such that only one of the outboard supply orifices 66 is open, an oversupply of fluid is still provided to the rebound valve 72 during the rebound stroke of the shock 10. Accordingly, even when the compression adjustments are set full "stiff" by leaving only the small compression orifice 68A open, the full range of rebound adjustments is still available.

Figure 5:
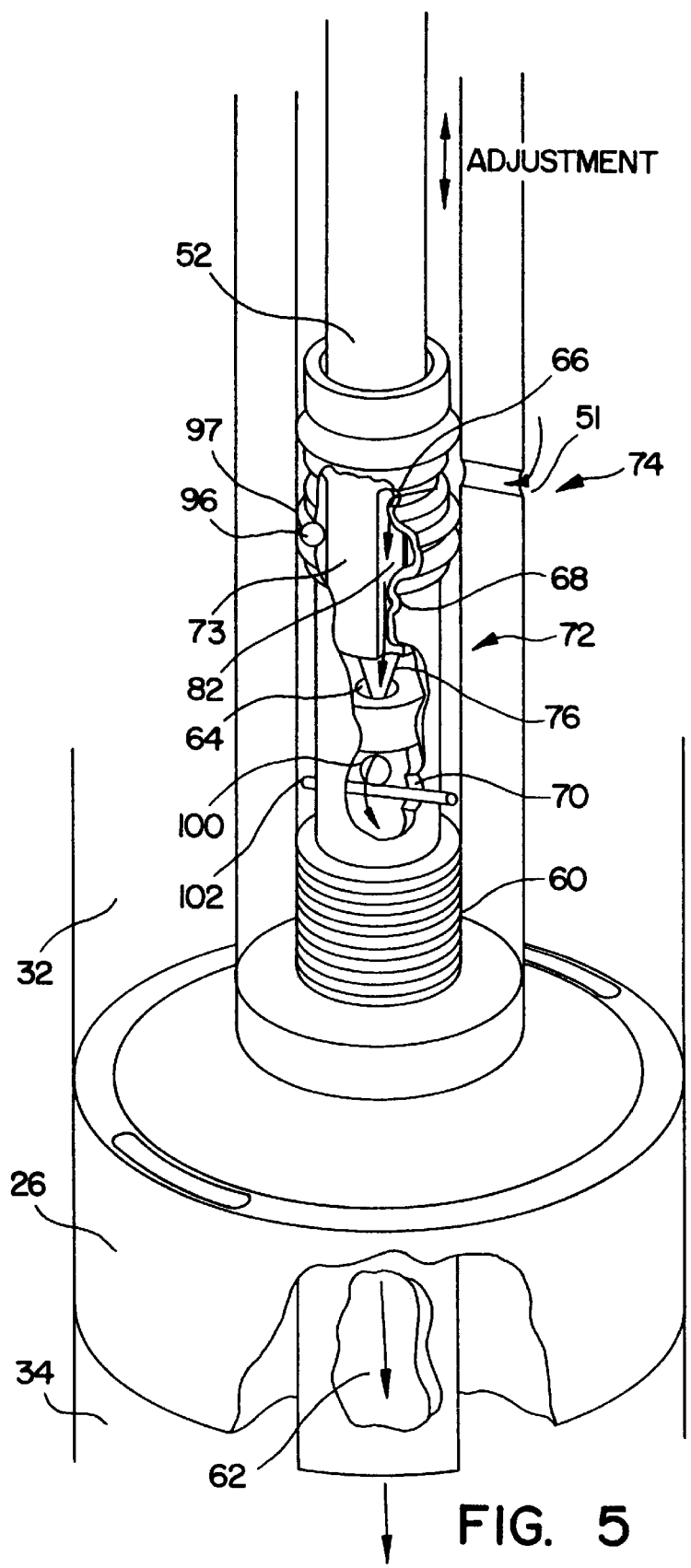
FIG. 5 is a detailed perspective view of the piston and adjustable valve portions of the shock in the rebound mode of operation.
Figure 11:
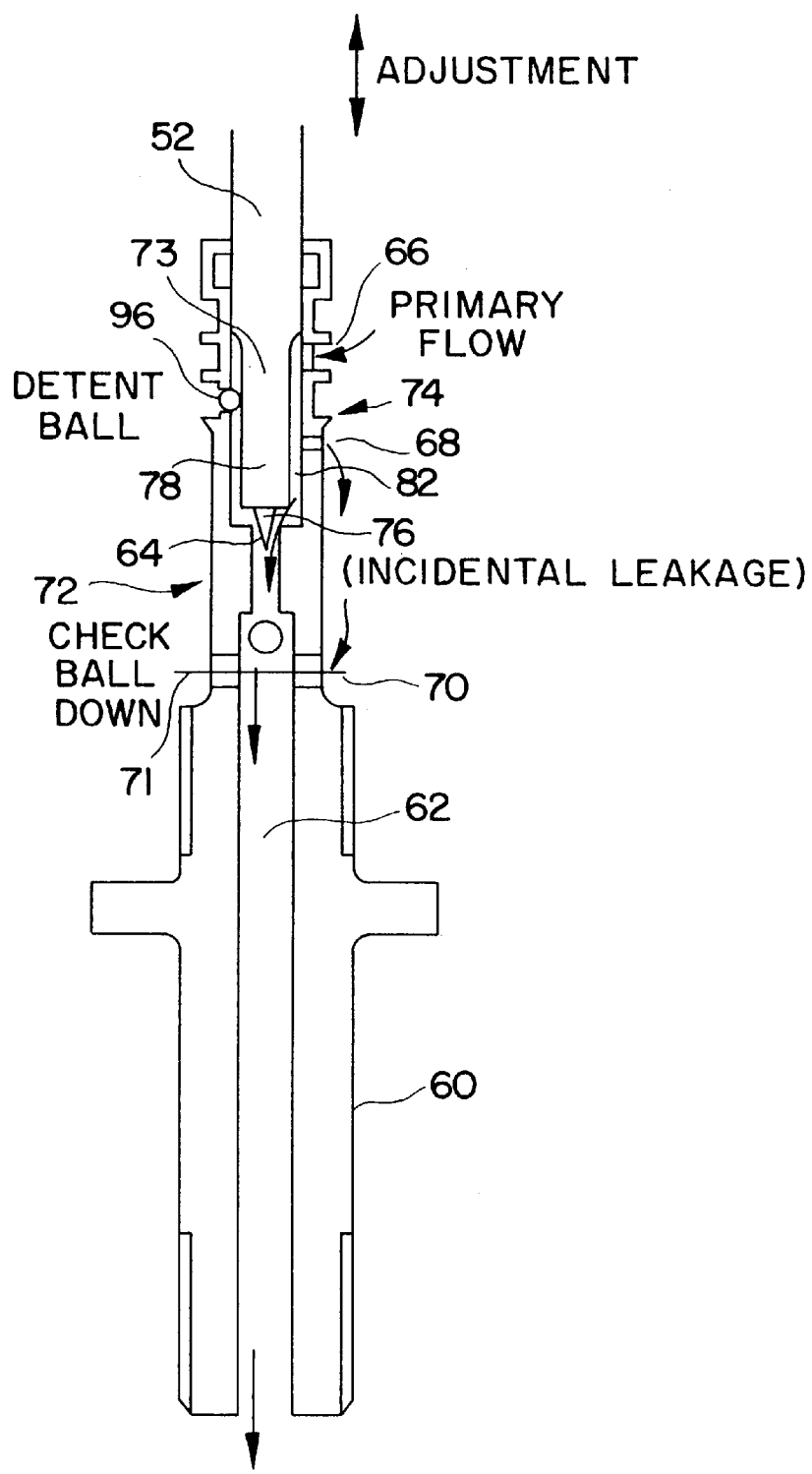
FIG. 11 is a detailed section view of the piston and adjustable valve portions of the shock in the rebound mode of operation.

During the rebound stroke, as shown in FIGS. 5 and 11, and assuming the tapered needle valve 72 is open at least some amount, the primary flow of fluid will occur from the chamber 32 to the chamber 34 through the primary orifice 51 in the piston rod 28, any open (or unshuttered) outboard supply orifices 66 in the piston rod 28, through an aligned fluid channel 82 in the extended portion of the needle 78, around the tapered portion 76 of the needle 78, through the rebound valve orifice 64 and the opened one way valve 100, and through the axial fluid passage 62 in the piston 26. In addition, a small or incidental amount of fluid will leak out any open compression orifice 68A or 68B and into the inboard supply orifice 70. Also, when the pressure in the chamber 32 exceeds the pressure of the rebound valve stack 48, fluid will additionally flow through the rebound orifices 44 in the piston 26, as can be seen in FIG. 2. By adjusting the rebound needle valve 64, the stiffness of the rebound characteristics can be tuned or changed.

Again referring to FIGS. 4 and 10, during the compression stroke of the shock 10, the check valve 100 will close, and as a result, oil is precluded from flowing through the rebound needle valve 64. Instead, during the compression stroke, oil is forced to flow from the chamber 34 to the second chamber 32 through the radial fluid passage 60 in the piston 26, the inboard supply orifice 70, and through the compression fluid channel 71 formed in the area of reduced diameter in the hub 60 (see FIG. 6), through open compression orifices 68A or 68B, along the extended fluid channels 82 in the needle 78 to the outboard supply orifices 66, and through the primary orifice 51 in the piston rod 28. Also, when the pressure in the chamber 34 exceeds the pressure of the compression valve stack 50, fluid will additionally flow through the compression orifices 46 in the piston 26 as can be seen in FIG. 2. By adjusting the shutter valve 74, the stiffness of the compression characteristics can be tuned or changed.

Thus, one of the important improvements in the present invention is a double adjustable valve 58 using a single needle 78 having both a tapered end portion 76 and extended cylindrical portion with fluid channels 82. The inventive needle 78 may be used in a shock that has a correspondingly configured rebound valve orifice 64 and a plurality of compression orifices 68. With two separate and independent adjustments of the single needle 78, both rebound and compression characteristics can be tuned. Specifically, the tapered portion 76 of the needle 78 can simply be raised and lowered in the rebound valve orifice 64 to adjust rebound stiffness. Similarly, a plurality of radially extending shutter faces 80, and radially extending fluid channels 82 are formed in the extended cylindrical portion of the needle 78, and the shutter faces 80 and fluid channels 82 are configured to cooperate with the plurality of compression orifices 68 throughout the entire range that the needle body 78 can be raised or lowered when adjusting rebound characteristics. The shutter faces 80 and channel grooves 82 are spaced apart around the circumference of the extended cylindrical portion of the needle body 78, and align with the compression orifices 68 in varying combinations to open none, one, some, or all of the compression orifices 68 when the needle body 78 is rotated.

As a result, the user can simply and independently adjust both the rebound and compression characteristics of a shock absorber. The rebound characteristics are adjusted by rotating a first knob 54 to raise or lower the tapered end 76 of the needle 78 relative to the rebound orifice 64 to correspondingly restrict or open the flow of oil through the rebound valve 72 during a rebound stroke of the shock. The compression characteristics are adjusted by rotating a second knob 56 to rotate the cylindrical body portion of the needle 78 having the plurality of axial fluid channels 82 to variably align selected of the channels 82 with the different sized compression orifices 68, to selectively open and close various combinations of the compression orifices 68 over the complete range that the needle can be raised or lowered.

Figure 9:
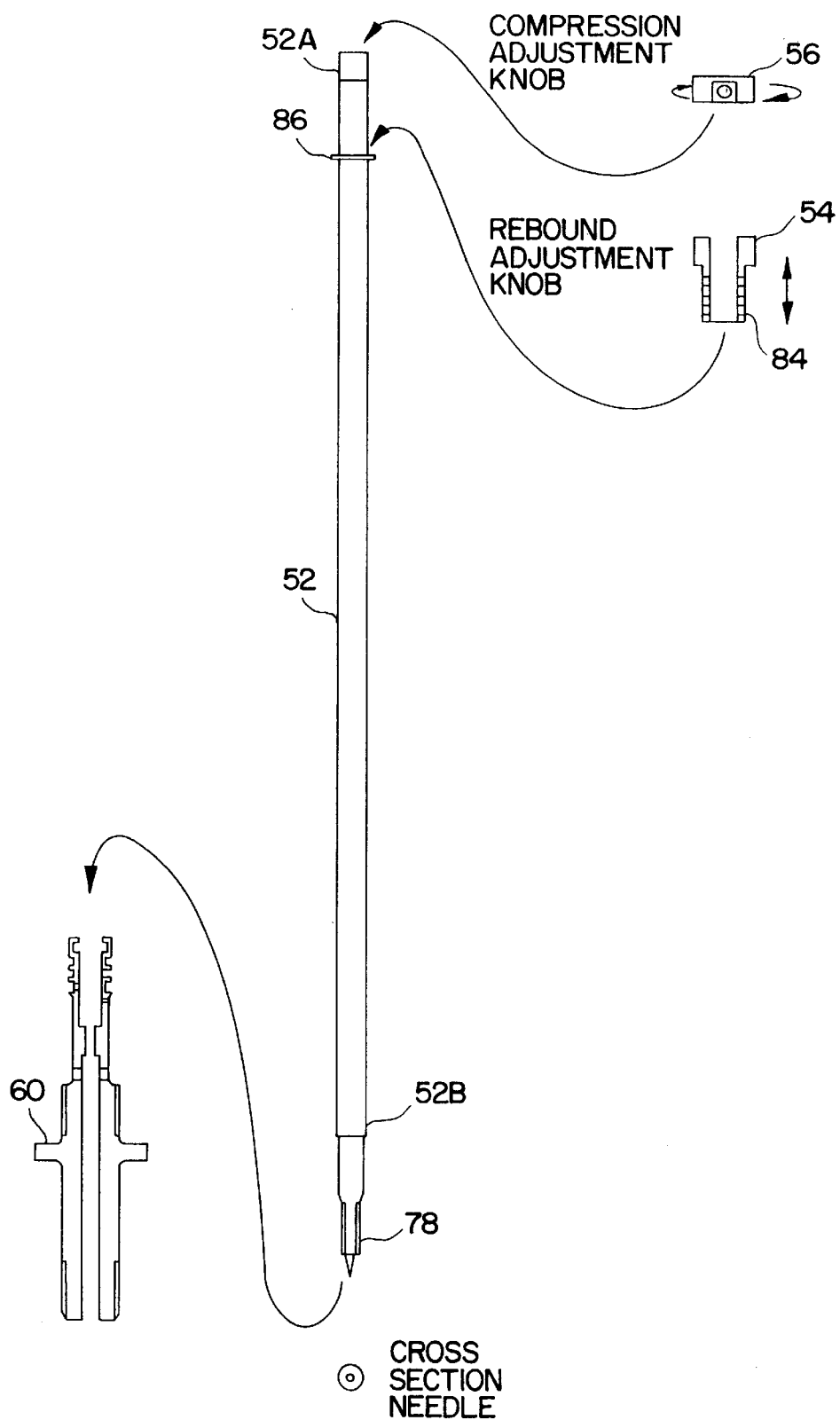
FIG. 9 is an exploded view of a the rebound and compression adjusting mechanism.

Shown in FIG. 9 is an exploded view of the adjusting mechanism of the shock. The rebound adjusting knob 54 includes threads 84 that coact with a correspondingly threaded portion of the hollow piston rod 28. A circlip 86 is retained in a groove in the adjusting rod 52. When the adjusting knob 54 is turned clockwise, it moves radially inward and bears against the circlip 86 to correspondingly, lower the adjusting rod 52. The compression adjusting knob 56 is securely threaded to the end 52A of the adjusting rod 52. When the compression knob 56 is rotated, the adjusting rod correspondingly rotates to open or close the shutter valve 74. When the rebound adjusting knob 54 is rotated counterclockwise, the threads 84 raise the knob to act against the underside of the compression knob 56, with the effect of raising the adjusting rod 52.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the spirit and scope of the invention and the following claims.

what is claimed is:

1. A shock absorber that is adjustable in both rebound and compression comprising:
   a). a shock cylinder having a fluid housing;
   b). a hollow piston rod axially and slidably retained within the cylinder and having a first end protruding outside of the shock cylinder and a second opposing end retained with the cylinder, the piston rod including a primary fluid orifice axially located between the first and second ends;
   c). a piston coupled proximate the second end of the piston rod and dividing the fluid housing of the shock cylinder into first and second fluid chambers, the piston including a central hub portion having:
      (i) a radial fluid passage extending throughout its center and opening at one end to the first fluid chamber and forming a rebound valve orifice at its other end;
      (ii) a hollow sleeve portion including at least one outboard supply orifice and a plurality of different-sized compression fluid orifices axially located intermediate the rebound valve orifice and the outboard supply orifice, the compression fluid orifices in the hollow piston rod include a large orifice and a small orifice,;
      (iii) at least one inboard supply orifice axially located between the rebound valve orifice and the opening in the radial fluid passage to the first fluid chamber;
   d). an adjustment rod axially and slidably retained within the hollow piston rod and having a first end portion located proximate the rebound valve orifice in the fluid passage and the compression fluid orifices, and a second end portion extending outside the protruding end of the piston rod;
   e). a double adjustable valve formed proximate the first end portion of the adjustment rod, and including an adjustable rebound needle valve and an adjustable compression shutter valve configured so that it may selectively: (a) open both compression orifices, (b) open only the large compression orifice, and (c) open only the small compression orifice wherein:
      (i) the rebound needle valve comprises a tapered end portion of a needle, the end portion being configured to cooperate with the rebound valve orifice in the radial fluid passage in the piston, and
      (ii) the compression shutter valve comprises an extended body portion of the needle, the body portion having a plurality of raised radially extending shutter faces separated by a plurality of radially extending fluid channels, and configured so that when a shutter face is aligned with a compression fluid orifice in the piston rod the orifice is closed, and when a fluid channel is aligned with a compression fluid orifice in the piston rod, the orifice is open and in communication with both fluid chambers through the inboard and outboard supply orifices;
   f). a rebound adjusting element coupled proximate the second end portion of the adjustment rod and configured to raise and lower the tapered end portion of the needle relative to the rebound valve orifice in the radial fluid passage; and
   g). a compression adjusting element coupled proximate the second end portion of the adjustment rod and configured to rotate the extended body portion of the needle to selectively align varying combinations of the shutter faces and fluid channels relative to the different sized compression fluid orifices.

2. The shock absorber of claim 1 wherein the rebound adjusting element comprises a rotating knob that is coupled to and causes the adjusting rod to raise or lower within the hollow piston rod when the knob is rotated.

3. The shock absorber of claim 1 wherein the compression adjusting element comprises a rotating knob that is coupled to and causes the adjusting rod to rotate within the hollow piston rod when the knob is rotated.

4. The shock absorber of claim 1 wherein the tapered portion of the needle valve is configured so that it may be selectively positioned relative to the rebound valve orifice between the range of fully closing the rebound valve orifice and fully opening the rebound valve orifice.

5. The shock absorber of claim 1 wherein the rebound and compression adjusting elements are independently operable.

6. The shock absorber of claim 1 wherein the shutter valve further includes a biased detent system interlocking with the radially extending fluid channels in the extended body portion of the needle.

7. The shock absorber of claim 1 wherein the outboard supply orifice in the central hub portion of the piston is large relative to the rebound needle valve so as to always provide an over-supply of fluid to the rebound needle valve during the rebound stroke regardless of any compression setting.

8. The shock absorber of claim 1 wherein there are a plurality of outboard supply orifices, each one being axially aligned with one of the different sized compression orifices.

9. The shock absorber of claim 1 wherein there are a plurality of inboard supply orifices.

10. The shock absorber of claim 1 further comprising a check valve located axially between the inboard supply orifice and the rebound needle valve, the check valve being operable when closed during a compression stroke to preclude oil from flowing through the rebound needle valve and to force oil to flow from the first chamber to the second chamber through the radial fluid passage, the inboard supply orifice, any open compression orifice, the fluid channel aligned with the open compression orifice, the outboard supply orifice, and the primary fluid orifice in the hollow piston rod.

11. The shock absorber of claim 1 wherein the compression adjusting element controls the flow of oil through the shutter valve by selecting which of the different sized fluid orifices in the piston rod are opened.

12. The shock absorber of claim 10 wherein during a rebound stroke the check valve is configured to open, and the piston forces oil to flow from the second chamber to the first chamber through the primary orifice in the hollow piston rod, the outboard supply orifice, a fluid channel in the needle body, the open needle valve, and the radial fluid passage in the piston.

13. The shock absorber of claim 12 wherein the rebound adjusting element controls the flow of oil through the needle valve by selecting the amount that the tapered portion of the needle protrudes within the rebound valve orifice.

14. A double adjustable needle valve for use in a shock that has a radial rebound orifice and a plurality of variously sized compression orifices, comprising:

a). a needle body having both a tapered end portion and an extended cylindrical portion, b). a tapered needle formed in the tapered end portion of the needle body and configured to be raised and lowed in the radial rebound orifice, and (c). a plurality of shutter faces and radial channel grooves formed in the extended cylindrical portion of the needle body, the shutter faces and grooves being spaced apart around the circumference of the extended cylindrical portion of the needle body and aligned with the compression orifices in varying combinations to selectively open either one, some, or all of the compression orifices when the needle body is rotated throughout the entire range that the needle body can be raised or lowered in the radial rebound orifice.

15. The needle valve of claim 14 wherein the tapered end portion of the needle closes the radial rebound orifice when lowered completely therein and opens the radial rebound orifice when raised therefrom.

16. A method of adjusting both rebound and compression characteristics of a shock absorber, the shock absorber including a moving piston dividing the shock into upper and lower fluid chambers, and having a radial rebound orifice and plurality of different sized compression orifices, the method comprising:

(a) adjusting rebound characteristics by rotating a first knob to raise or lower a tapered end portion of a needle relative to the radial rebound orifice to correspondingly increase or restrict the flow of oil through the rebound orifice during a rebound stroke of the shock;

(b) adjusting compression characteristics by rotating a second knob to rotate a cylindrical portion of the needle having a plurality of axial fluid channels to variably align selected of the channels with the plurality of different sized compression orifices to selectively place various combinations of the different sized compression orifices in communication with both fluid chambers over the complete range that the needle is raised or lowered during adjustment of the rebound characteristics.

17. The method of claim 16 further comprising using a detent ball biased by at least two o-rings to engage one of the axial grooves in the cylindrical portion of the needle to retain the selected alignment between the channels and the compression orifices.

\* \* \* \* \*